US008199925B2

(12) United States Patent
Konagai

(10) Patent No.: US 8,199,925 B2
(45) Date of Patent: Jun. 12, 2012

(54) LOUDSPEAKER ARRAY AUDIO SIGNAL SUPPLY APPARATUS

(75) Inventor: Yusuke Konagai, Hamamatsu (JP)

(73) Assignee: Yamaha Corporation (JP)

( * ) Notice: Subject to any disclaimer, the term of this patent is extended or adjusted under 35 U.S.C. 154(b) by 198 days.

(21) Appl. No.: 10/585,269

(22) PCT Filed: Jan. 4, 2005

(86) PCT No.: PCT/JP2005/000158
§ 371 (c)(1),
(2), (4) Date: Oct. 4, 2006

(87) PCT Pub. No.: WO2005/067348
PCT Pub. Date: Jul. 21, 2005

(65) Prior Publication Data

US 2007/0165878 A1 Jul. 19, 2007

(30) Foreign Application Priority Data

Jan. 5, 2004 (JP) ................................ 2004-000675

(51) Int. Cl.
*H04B 3/00* (2006.01)
*H04R 1/02* (2006.01)
*H04R 1/40* (2006.01)
*H04R 3/00* (2006.01)

(52) U.S. Cl. ..................... 381/77; 80/89; 80/97; 80/116

(58) Field of Classification Search .................... 381/89, 381/335, 111, 58–59, 63, 98, 77–80, 116, 381/387, 92, 17–19, 97
See application file for complete search history.

(56) References Cited

U.S. PATENT DOCUMENTS 3,772,479 A 11/1973 Hilbert
4,024,344 A 5/1977 Dolby et al.
4,118,601 A 10/1978 Yeap
4,227,160 A 10/1980 Tamori et al.
(Continued)

FOREIGN PATENT DOCUMENTS

CA 2107320 C 3/1997
(Continued)

OTHER PUBLICATIONS

Notification of Reason for Refusal issued Apr. 8, 2008 in corresponding Japanese Patent Application No. 2003-429819 of related co-pending US. Appl. No. 10/584,672; English Translation Provided.

(Continued)

*Primary Examiner* — Devona Faulk
*Assistant Examiner* — George Monikang
(74) *Attorney, Agent, or Firm* — Rossi, Kimms & McDowell LLP

(57) ABSTRACT

A first directivity parameter to provide a narrow directivity and a second directivity parameter to provide a wide directivity are preset for a directivity control apparatus to control the directivity of an array loudspeaker system. The directivity control apparatus selects either the first directivity parameter or the second directivity parameter in accordance with an instruction that is entered through an operating unit to select the directional characteristic of a loudspeaker array. Then, based on the selected directivity parameter, the directivity control apparatus generates delay control information, to be supplied to a delay circuit, and generates gain control information, to be supplied to a weighting unit.

8 Claims, 10 Drawing Sheets

U.S. PATENT DOCUMENTS

| | | | | | |
|---|---|---|---|---|---|
| 4,472,834 | A | * | 9/1984 | Yamamuro et al. | 381/61 |
| 4,503,553 | A | | 3/1985 | Davis | |
| 4,984,273 | A | | 1/1991 | Aylward et al. | |
| 4,991,687 | A | | 2/1991 | Oyaba et al. | |
| 5,109,419 | A | | 4/1992 | Griesinger | |
| 5,233,664 | A | * | 8/1993 | Yanagawa et al. | 381/89 |
| 5,524,054 | A | | 6/1996 | Spille | |
| 5,631,714 | A | | 5/1997 | Saadoun | |
| 5,666,424 | A | | 9/1997 | Fosgate et al. | |
| 5,675,655 | A | * | 10/1997 | Hatae | 381/26 |
| 5,930,373 | A | | 7/1999 | Shashoua et al. | |
| 5,953,432 | A | * | 9/1999 | Yanagawa et al. | 381/335 |
| 6,005,948 | A | | 12/1999 | Maeda | |
| 6,128,395 | A | * | 10/2000 | De Vries | 381/387 |
| 6,181,796 | B1 | * | 1/2001 | Johnson | 381/28 |
| 6,240,189 | B1 | | 5/2001 | Aylward | |
| 6,285,891 | B1 | | 9/2001 | Hoshino | |
| 6,498,852 | B2 | | 12/2002 | Grimani | |
| 6,535,610 | B1 | * | 3/2003 | Stewart | 381/92 |
| 6,804,361 | B2 | | 10/2004 | Hosoi et al. | |
| 7,054,448 | B2 | | 5/2006 | Yoshino et al. | |
| 7,319,641 | B2 | | 1/2008 | Goudie et al. | |
| 7,515,719 | B2 | | 4/2009 | Hooley et al. | |
| 7,720,237 | B2 | | 5/2010 | Bharitkar et al. | |
| 7,822,496 | B2 | | 10/2010 | Asada et al. | |
| 7,826,626 | B2 | | 11/2010 | Bharitkar et al. | |
| RE42,390 | E | | 5/2011 | Hosoi et al. | |
| 2001/0016047 | A1 | | 8/2001 | Ohta | |
| 2002/0191807 | A1 | * | 12/2002 | Asada et al. | 381/335 |
| 2003/0185404 | A1 | | 10/2003 | Milsap | |
| 2004/0071299 | A1 | | 4/2004 | Yoshino | |
| 2004/0151325 | A1 | | 8/2004 | Hooley et al. | |
| 2004/0193050 | A1 | | 9/2004 | Ogawa | |
| 2004/0252844 | A1 | | 12/2004 | Christensen et al. | |
| 2005/0089182 | A1 | | 4/2005 | Troughton et al. | |
| 2005/0271230 | A1 | | 12/2005 | Sasaki | |
| 2006/0050897 | A1 | | 3/2006 | Asada et al. | |
| 2006/0153391 | A1 | | 7/2006 | Hooley et al. | |
| 2006/0204022 | A1 | | 9/2006 | Hooley et al. | |
| 2006/0233378 | A1 | | 10/2006 | Kim et al. | |
| 2007/0076905 | A1 | | 4/2007 | Konagai et al. | |
| 2009/0296943 | A1 | | 12/2009 | Martin | |

FOREIGN PATENT DOCUMENTS

| | | | |
|---|---|---|---|
| CN | 1200639 | A | 12/1998 |
| DE | 1 762 735 | A | 10/1970 |
| DE | 1762735 | | 10/1970 |
| DE | 27 290 51 | A1 | 1/1979 |
| GB | 1122851 | | 8/1968 |
| GB | 2 273 848 | A | 6/1994 |
| GB | 2373956 | A | 10/2002 |
| JP | 5-41897 | A | 2/1993 |
| JP | 05-091589 | A | 4/1993 |
| JP | 05091589 | A | 4/1993 |
| JP | 5-276591 | A | 10/1993 |
| JP | 6-38289 | A | 2/1994 |
| JP | 6-62488 | A | 3/1994 |
| JP | 06-205496 | A | 7/1994 |
| JP | 6-209500 | A | 7/1994 |
| JP | 06-225379 | A | 8/1994 |
| JP | 6-225379 | A | 8/1994 |
| JP | 6-261385 | A | 9/1994 |
| JP | 6-269096 | A | 9/1994 |
| JP | 9-121400 | A | 6/1997 |
| JP | 9-233591 | A | 9/1997 |
| JP | 9-233951 | A | 9/1997 |
| JP | 09-259539 | A | 10/1997 |
| JP | 11-027604 | A | 1/1999 |
| JP | 11-27604 | A | 1/1999 |
| JP | 11-136788 | A | 5/1999 |
| JP | 11-69474 | A | 9/1999 |
| JP | 2000-184488 | A | 6/2000 |
| JP | 2001-025084 | A | 1/2001 |
| JP | 2001128279 | A | 5/2001 |
| JP | 2001-346297 | A | 12/2001 |
| JP | 2002-345077 | A | 11/2002 |
| JP | 2003-23689 | A | 1/2003 |
| JP | 2003-510924 | A | 3/2003 |
| JP | 2003-230071 | A | 8/2003 |
| JP | 2004-172661 | A | 6/2004 |
| JP | 2004-172703 | A | 6/2004 |
| JP | 2004-186895 | A | 7/2004 |
| JP | 2004-193698 | A | 7/2004 |
| JP | 2004-531125 | | 10/2004 |
| JP | 2004-531125 | A | 10/2004 |
| JP | 2004-336530 | A | 11/2004 |
| JP | 2004-349795 | A | 12/2004 |
| JP | 2004-350173 | A | 12/2004 |
| JP | 2004-363695 | A | 12/2004 |
| JP | 2004-363697 | A | 12/2004 |
| JP | 2005-12765 | A | 1/2005 |
| JP | 2005-27020 | A | 1/2005 |
| JP | 2006238155 | A | 2/2005 |
| JP | 2005-80079 | A | 3/2005 |
| JP | 2006319390 | A | 5/2005 |
| JP | 2006-067301 | A | 3/2006 |
| JP | 2006-518956 | A | 8/2006 |
| JP | 2006-304128 | A | 11/2006 |
| WO | 99/08479 | A1 | 2/1999 |
| WO | WO 01/23104 | A2 | 4/2001 |
| WO | 0278388 | A2 | 3/2002 |
| WO | WO 02/078388 | A2 | 10/2002 |
| WO | 03/071827 | A2 | 8/2003 |
| WO | 2004/066673 | A1 | 8/2004 |
| WO | 2004/075601 | A1 | 9/2004 |
| WO | 2005/015956 | A1 | 2/2005 |

OTHER PUBLICATIONS

Search Report issued in corresponding European patent application No. 05703397.9-2225, PCT/JP2005/000158, issued on Aug. 6, 2007.

Meyer, David G.; "Digital Control of Loudspeaker Array Directivity"; Journal of the Audio Engineering Society; Oct. 1984; pp. 747-754; vol. 32—No. 12; New York USA.

Relevant portion of International Search Report of corresponding PCT Application PCT/JP2005/000158.

Notification of Reasons for Refusal issued in corresponding application No. 2004-000675, dated Feb. 19, 2008.

Notification of Reasons for Refusal issued in corresponding Japanese patent application No. 2004-000675.

International Search Report issued in related co-pending application No. PCT/JP2004/019736.

Decision of Refusal issued in corresponding Japanese application No. 2004-000675, dated May 20, 2008.

Supplementary European Search Report dated Sep. 29, 2009 issued in corresponding European Patent Application No. 04808086.5, issued in related co-pending U.S. Appl. No. 10/584,672.

Supplementary European Search Report for corresponding 05703398.7, dated Aug. 7, 2008. Cited in related U.S. Patent 7,920,710.

Notification for Reasons for Refusal for corresponding JP 2004-002512, dated Mar. 18, 2008. Cited in related U.S. Patent 7,920,710. Partial English translation provided.

Notification of Reason for Refusal cited in co-pending U.S. Appl. No. 10/585,655, which corresponds to JP 2004-002511, dated Jan. 22, 2008. English language translation provided.

Notification of Reason for Refusal cited in co-pending U.S. Appl. No. 10/585,655, which corresponds to JP 2004-002511, dated Aug. 26, 2008. English language translation provided.

Supplementary European Search Report cited in co-pending U.S. Appl. No. 10/585,655, which corresponds to EP 05703396.1, dated Jun. 25, 2010.

International Search Report cited in co-pending U.S. Appl. No. 11/574,248, which corresponds to PCT/JP2005/015562, dated Dec. 13, 2005.

Notification of Reason for Refusal cited in co-pending U.S. Appl. No. 11/574,248, which corresponds to JP 2004-246963, dated Jun. 6, 2006. English language translation provided.

Chinese Office Action cited in cited in co-pending U.S. Appl. No. 11/574,248, which corresponds to CA 2005800287301, dated Apr. 3, 2009. English language translation provided.

Supplementary European Search Report cited in co-pending U.S. Appl. No. 11/574,248 which corresponds to EP 05774560.6, dated Sep. 9, 2009.
International Search Report cited in co-pending U.S. Appl. No. 11/817,074, which corresponds to PCT/JP2006/303319, dated May 16, 2006.
Notification of Reasons for Refusal cited in co-pending U.S. Appl. No. 11/817,074, which corresponds to JP 2005-051099, dated Sep. 7, 2010. English language translation provided.
Notification of the First Office Action cited in co-pending U.S. Appl. No. 11/817,074, which corresponds to of Chinese Application No. 2006800060275, Issued May 8, 2009.
"Wideband Beamforming by Means of Multiple Band-Division Using Dolph-Chebyshev Spatial Filters"; Journal of Institute of Electronics, Information and Communication Engineers; Dec. 1995; pp. 1576-1584; vol. J78-A. Cited in co-pending U.S. Appl. No. 12/044,603.
Ohya et al; "Directional Array Speakers with the Specified Beam Direction by means of a Band-Division Design"; 10th Digital Signal Processing Symposium; Nov. 1-2, 1995; pp. 59-64. Cited in specification; English abstract provided. Cited in co-pending U.S. Appl. No. 12/044,603.
Notification of Reason for Refusal cited in co-pending U.S. Appl. No. 12/044,603, which corresponds to EP 08003945.6-2225, dated Jul. 7, 2008. English language translation provided.
Co-Pending U.S. Appl. No. 10/585,665. Specification, Claims and Drawings.
Co-Pending U.S. Appl. No. 11/574,248. Specification, Claims and Drawings.
Co-Pending U.S. Appl. No. 11/817,074. Specification, Claims and Drawings.
Co-Pending U.S. Appl. No. 12/044,603. Specification, Claims and Drawings.
Extended European Search report cited in co-pending U.S. Appl. No. 12/044,603, dated Jul. 7, 2008.

* cited by examiner

LOUDSPEAKER ARRAY AUDIO SIGNAL SUPPLY APPARATUS

This application is a U.S. National Phase Application of PCT International Application PCT/JP2005/000158 filed on Jan. 4, 2005.

TECHNICAL FIELD

The present invention relates to an audio signal supply apparatus that supplies an audio signal, such as a sound, to a loudspeaker array that is constituted by a plurality of loudspeaker units.

BACKGROUND ART

In recent years, large, thin televisions, such as plasma televisions and liquid crystal televisions, have rapidly spread to average homes. These large, thin televisions used to have problems resulting from small viewing angles. However, through various improvements, the problems with viewing angles have been largely eliminated, and when televisions are installed in a spacious room, we can view scenes from various locations. While much consideration has been given to improving pictures, as described above, sounds have not been much taken into account. For example, many loudspeakers employed for large, thin televisions are a combination of conventional loudspeakers, such as two-way loudspeakers, that have dipole type directional characteristics (see, for example, patent document 1).

Patent Document 1: Japanese Patent Laid-Open Publication No. Hei 11-69474

However, for a large, thin television that employs the above described loudspeakers, a problem is that the audio quality around the loudspeakers is deteriorated in location off the front of the loudspeakers. Further, in order to hear a clear sound at a location not near a television, the volume of the loudspeakers must be increased. However, a problem is that at midnight, when sound can bother other people, or in a non-soundproofed house in a densely built-up area, the volume can not be turned up high, and earphones or headphones must be employed for listening.

DISCLOSURE OF THE INVENTION

The present invention is provided while taking into account the above described problems, and one objective of the present invention is to provide an array loudspeaker audio signal supply apparatus that can achieve wide directivity and can also achieve efficient directivity that permits an audience to clearly hear sounds at a low volume.

To resolve the above problems, an audio signal supply apparatus according to the present invention, which supplies an audio signal to a loudspeaker array constituted by a plurality of loudspeaker units, is characterized by comprising:

delay means, for performing, in accordance with delay control information that is provided, a delay process for each audio signal to be supplied to the loudspeaker units;

weighting means, for weighting, in accordance with gain control information that is provided, each audio signal to be supplied to the loudspeaker units;

storage means, for storing a first directivity parameter, used to regard a directional characteristic for the loudspeaker as a narrow directivity, and a second directivity parameter, used to regard the directional characteristic for the loudspeaker as a wide directivity;

input means, for receiving a selection instruction for the directional characteristics; and directivity control means, for selecting one of the directivity parameters in accordance with the selection instruction that is input, for employing the selected directivity parameter to generate the delay control information and the gain control information, and for supplying the delay control information and the gain control information to the delay means and the weighting means.

According to this configuration, using a remote controller, a user need only perform a simple operation to select the directional characteristics for the loudspeaker array. Then, the user can switch between narrow directivity, such that, although the volume is low as a whole, the sound can be heard at a sufficient volume at a location in an arbitrary direction (a focal direction), and a wide directivity, such that the sound having high quality can be heard, regardless of audience locations.

Furthermore, according to the above described configuration, the selection instruction designating the selection of the narrow directivity includes position information for determining the direction of the directivity. When the selection instruction designating the selection of the narrow directivity is received, the directivity control means may select the first directivity parameter and may generate the delay control information based on the selected first directivity parameter and the position information.

Further, another audio signal supply apparatus according to the present invention, which supplies an audio signal to a loudspeaker array constituted by a plurality of loudspeaker units, is characterized by comprising:

branching means, for branching an input audio signal to provide two or more signals;

first processing means, for performing, in accordance with first directivity control information that is provided, a delay process and/or weighting for each signal that is obtained by branching one audio signal and that is to be supplied to the loudspeaker units;

second processing means, for performing, in accordance with second directivity control information that is provided, a delay process and/or weighting for each signal that is obtained by branching one audio signal and that is to be supplied to the loudspeaker units;

directivity control means, for generating the first directivity control information and the second directivity control information so that directional characteristic of the loudspeaker array obtained by the first process differs from directional characteristic of the loudspeaker array obtained by the second process, and for supplying the thus generated information respectively to the first processing means and the second processing means; and adding means, for adding the audio signal that has been processed by the first processing means to the audio signal that has been processed by the second processing means.

According to this configuration, one audio signal can be output that has two different directional characteristics simultaneously. Therefore, when, for example, as shown in FIG. 10, a hearing-unimpaired person and a hearing-impaired person listen to music in the same space (e.g., a living room), musical sounds 2, for hearing-unimpaired persons, are output with wide directivity, while musical sounds 1, for hearing-impaired persons, are output with narrow directivity toward the hearing-impaired person. Thus, both a hearing-unimpaired person and a hearing-impaired person can listen to music at their appropriate volumes.

Moreover, according to the above configuration, the directional characteristic of the loudspeaker array obtained through the first process may be a narrow directivity, and the directional characteristic of the loudspeaker array obtained through the second process may be a wide directivity (see FIG. 10). Further, the directional characteristics for the loudspeaker array obtained through the individual processes may be narrow directivities that are aimed in different directions (see FIG. 11).

In addition, frequency property correction means, for correcting a frequency property for signals that are obtained by branching one audio signal, is arranged between the branching means and the first process means. In accordance with the first directivity control information that is provided, the first process means may process each of the audio signals, for which the frequency property has been corrected and which are to be supplied to the loudspeaker units.

As described above, according to the present invention, a wide directivity can be provided, and an efficient directivity can also be provided such that, at a small volume, a listener can still clearly hear sounds.

BEST MODES FOR CARRYING OUT THE INVENTION

Before the individual modes according to the present invention are described, the basic theory of the present invention will first be explained.

Figure 1:
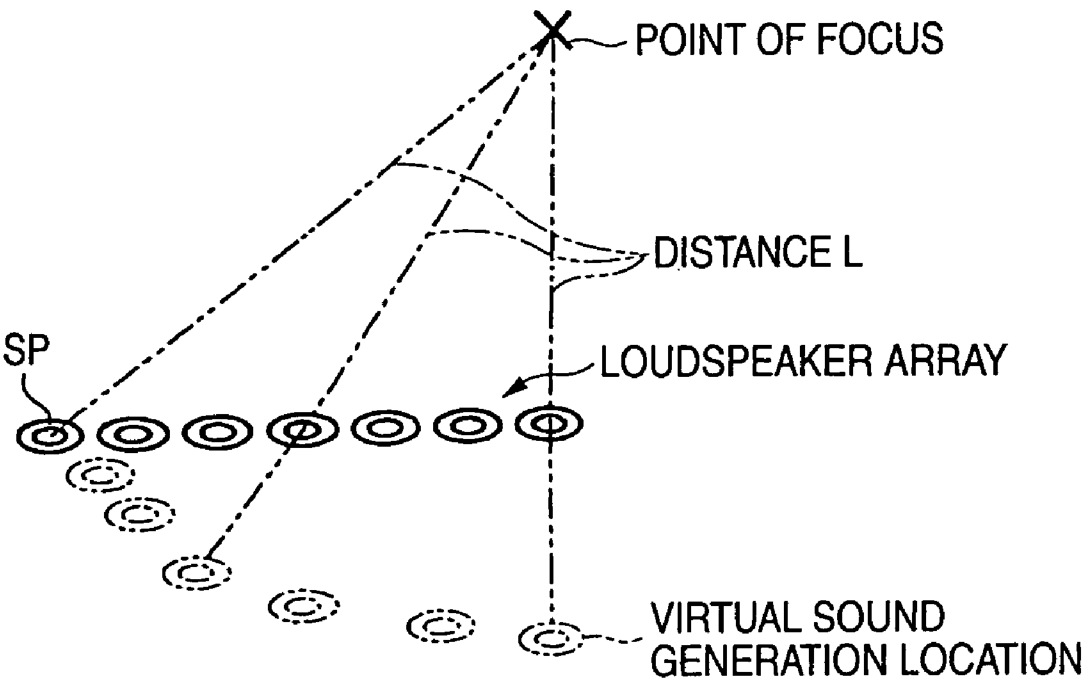
FIG. 1 is a diagram for explaining directivity control of a delay array type according to the first basic theory.

FIG. 1 is a diagram for explaining directivity control of a delay array type that employs a loudspeaker array (constituted by a plurality of small loudspeaker units SP) according to a first basic theory. When the amount of a delay, which is consonant with a difference between the path from the center of the loudspeaker array to a specific point (point of focus) in space and the path from the loudspeaker units SP to the point of focus, is given to an audio signal that is to be supplied to the loudspeaker units SP, sound waves output by the individual loudspeaker units SP reach the point of focus at the same time. That is, the loudspeaker units SP can be regarded as being located at virtual sound generation locations (locations where distances L from the point of focus are equal) indicated by broken lines in FIG. 1, and the sound pressure near the point of focus is locally raised.

Figure 2:
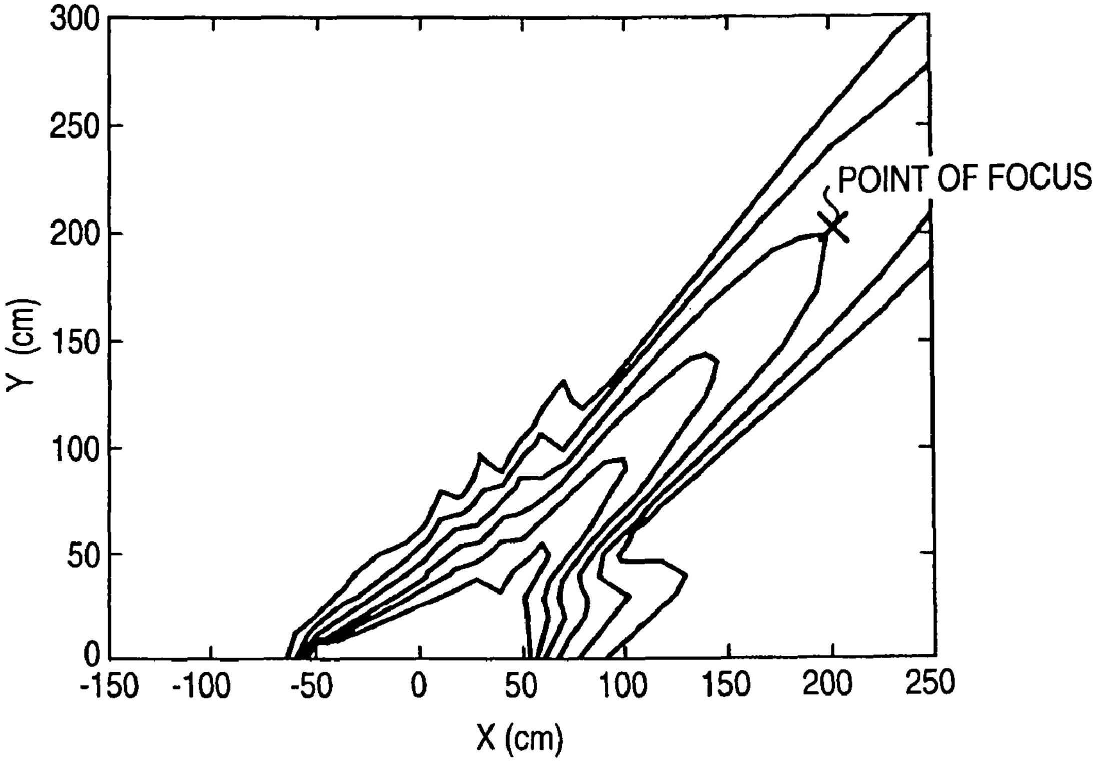
FIG. 2 is a diagram showing an example directional distribution for a loudspeaker according to this theory.

FIG. 2 is a diagram showing an example directional distribution of a loudspeaker array that employs a delay array system, and the contour of the sound pressure for each 3 dB is indicated by a solid line. For the loudspeaker array, it is assumed that loudspeaker units are arranged linearly at intervals of about 5 cm within a width of 100 cm (=−50 to 50 cm in FIG. 2). As shown in this diagram, for the loudspeaker array that employs the delay array system, such a directional distribution was obtained that it looks as though a sound wave beam was emitted toward the point of focus.

Figure 3:
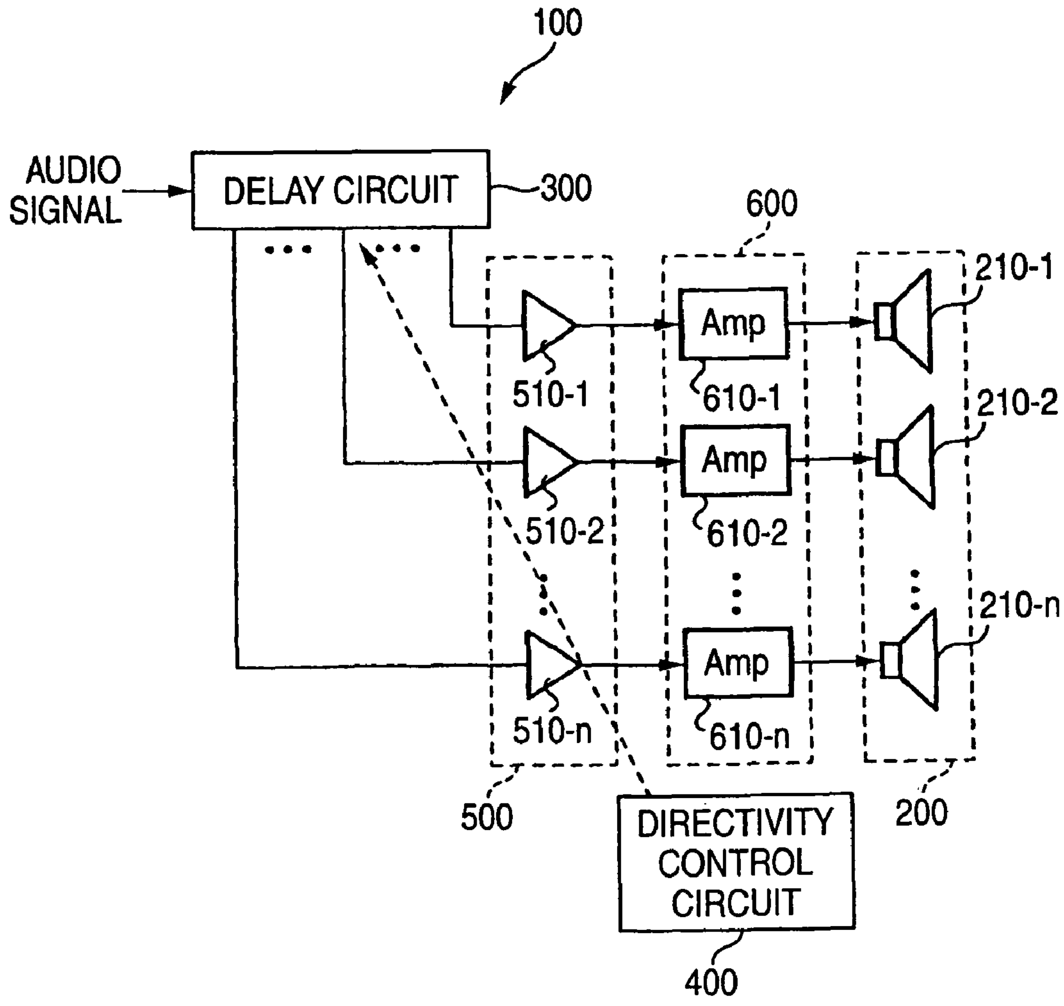
FIG. 3 is a diagram showing the configuration of the essential section of an array loudspeaker system that employs this theory.

The arrangement of the essential section of an array loudspeaker system 100 that employs this delay array system is shown in FIG. 3. The array loudspeaker system 100 includes: a loudspeaker array 200, constituted by a plurality of speaker units 210-*k* ($1 \leqq k \leqq n$); a delay circuit 300; a directivity control apparatus 400; a weighting unit 500; and an amplification unit 600. Generally, an A/D converter and a D/A converter are provided at the front stage of the delay circuit 300, the front stage of the amplification unit 600, etc.; however, they are not shown, for simplification.

In accordance with delay control information provided by the directivity control apparatus 400, the delay circuit 300 performs a delay process for each audio signal to be supplied to the loudspeaker units 210-*k*. In order to form a point of focus at a desired position, the directivity control apparatus 400 obtains the amounts of delays to be provided for the individual audio signals, generates delay control information that represents the obtained amounts of delays, and supplies the delay control information to the delay circuit 300. Specifically, the spatial coordinates of the individual loudspeaker units 210-*k* and the spatial coordinates of the point of focus are employed, and the amounts of delays are calculated so as to compensate for differences in distances from the point of focus to the individual loudspeaker units 210-*k* (see FIG. 1).

The weighting unit 500 is constituted by the same number of multipliers 510-*k* as the loudspeaker units 210-*k*, and adds to the audio signals, which are obtained through the delay process and which are transmitted by the delay circuit 300, a weight using a weight coefficient, such as a window function coefficient or a gain coefficient. The amplification unit 600 is constituted by the same number of amplifiers 610-*k* as the loudspeaker units 210-*k*, and amplifies the audio signals from the weighting unit 500. The audio signals amplified by the amplification unit 600 are transmitted to the individual loudspeaker units 210-*k* that constitute the loudspeaker array 200, and are output as sound waves. The sound waves output by the loudspeaker units 210-*k* acquire the same phase at an arbitrary point (point of focus) in space, and the efficient directivity (hereinafter, a narrow directivity), where the sound pressure in the point of focal direction is locally high, is provided.

As described above, according to the array loudspeaker system 100 that employs the delay array system, the narrow directivity can be provided and the direction of the directivity can be arbitrarily changed simply by varying the amount of delay.

An explanation will be given for directivity control of a Bessel array type that employs a loudspeaker array according to a second basic theory. The Bessel array is a method whereby an array (a loudspeaker array) of loudspeaker units that are arranged regularly is weighted by using a coefficient based on the Bessel function, so that the spherical radiation characteristics of sounds are obtained. Since this theory is conventionally well known, no further explanation for this will be given, but a reference document for this is, for example, "Multiple loudspeaker arrays using Bessel coefficients" (W. J. W. KITZEN, ELECTRONIC COMPONENTS AND APPLICATIONS, VOL. 5 NO. 4, SEPTEMBER 1983).

Figure 4:
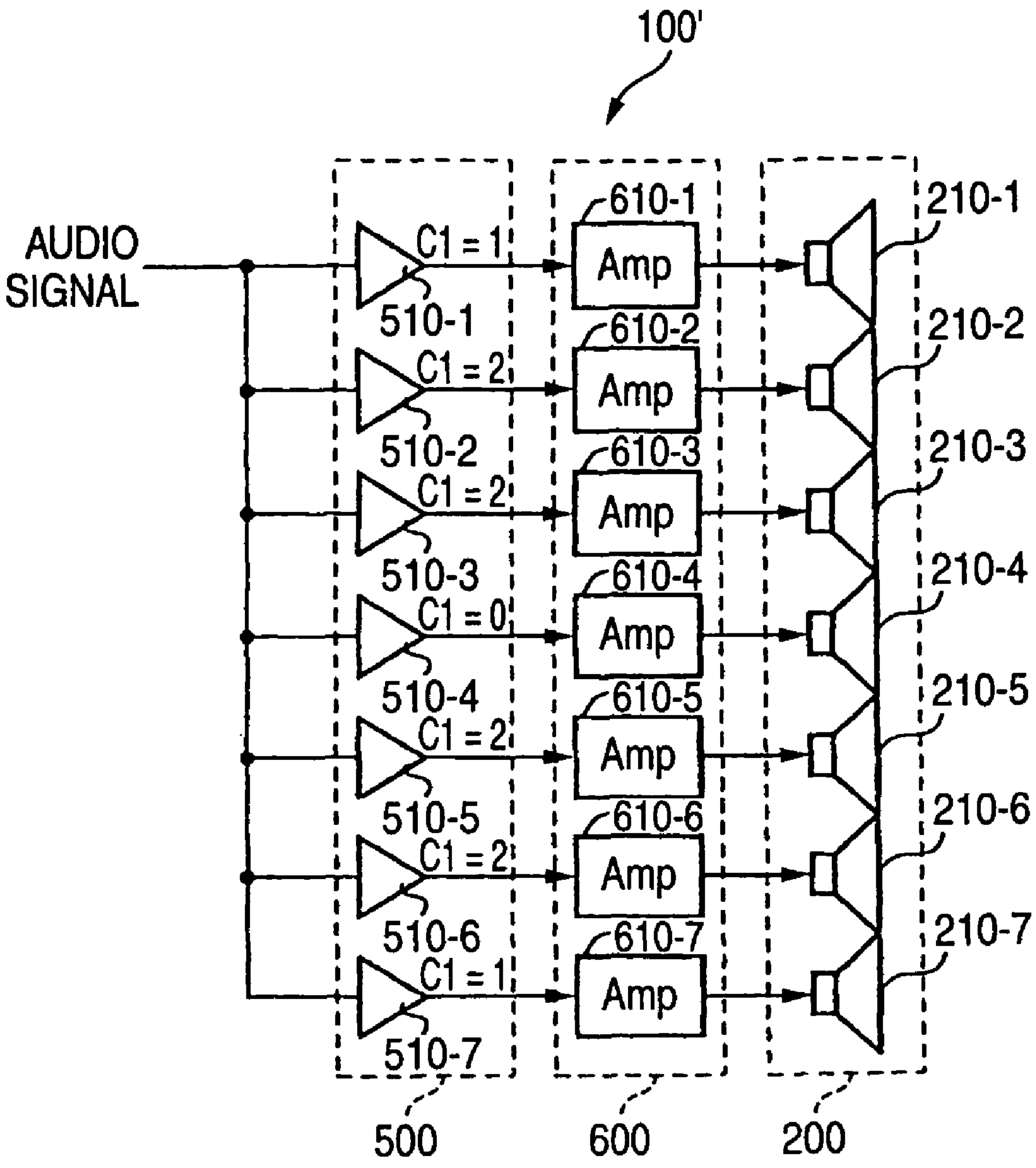
FIG. 4 is a diagram showing the arrangement of the essential section of an array loudspeaker system that employs a Bessel array method according to a second basic theory.
Figure 5:
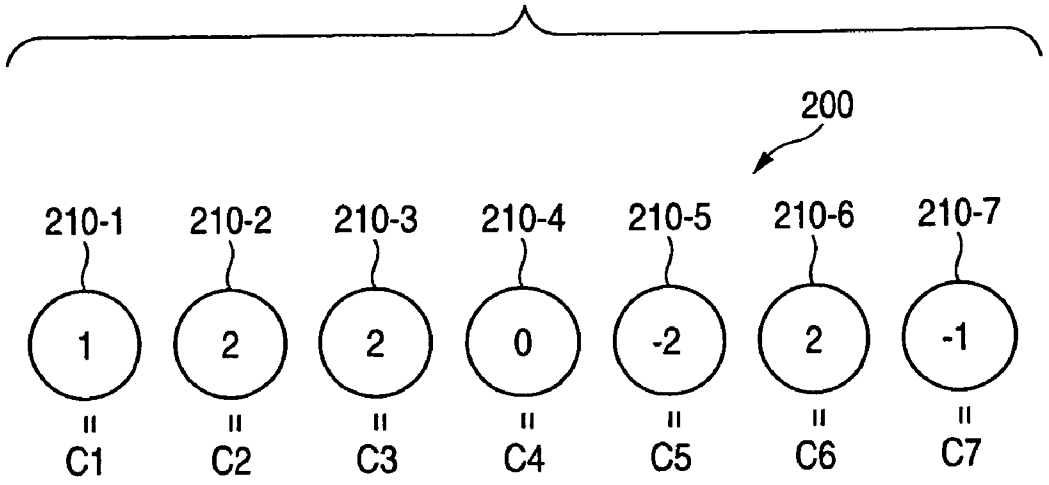
FIG. 5 is a diagram showing a relation between the locations of the individual loudspeaker units and gains according to this theory.

The Bessel array is widely used as a method for providing wide directivity, such that music sounds, etc., can reach to all off an audience present in a large space, while a large volume is obtained by increasing the number of loudspeaker units. FIG. 4 is a diagram showing the arrangement of the essential section of an array loudspeaker system 100' that employs the Bessel array method. FIG. 5 is a diagram showing an example relation between the locations of loudspeaker units 210-*k*, which constitute the loudspeaker array 200, and gains. In these diagrams, the same signs are provided for the portions corresponding to those in FIG. 3, and no detailed explanation for them will be given.

A loudspeaker array 200 shown in FIGS. 4 and 5 is constituted by seven loudspeaker units 210-1 to -7, which are arranged linearly at about the same intervals. Multipliers 510-1 to -7 that constitute a weighting unit 500 add to audio signals, which are to be supplied to the corresponding loudspeaker units 210-1 to -7, weights (gains) using Bessel array coefficients C1 to C7, which are introduced by the Bessel function. Since the weighting process based on the Bessel function is performed in this manner, directivity (hereinafter wide directivity) for which it appears a nondirectional simple sound source radially emitted a sound wave is provided.

The details of the individual basic theories according to the present invention have been explained. A first mode that employs these basic theories will now be described.

First Mode

Figure 6:
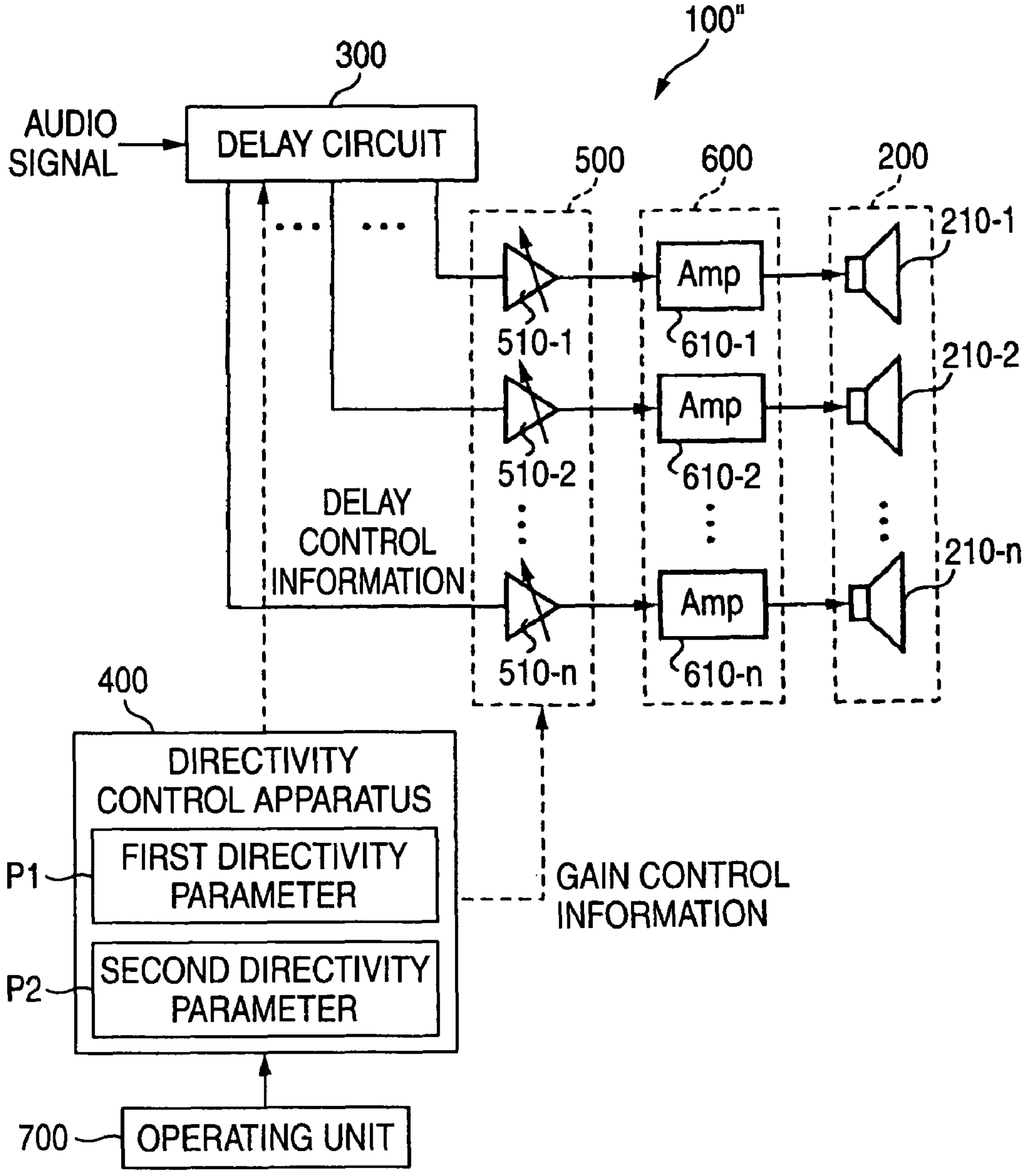
FIG. 6 is a diagram showing the arrangement of the essential section of an array loudspeaker system according to a first mode.

FIG. 6 is a diagram showing the arrangement of the essential section of an array loudspeaker system 100" according to the first mode. The array loudspeaker system 100" is a system that provides switching between (selection of) a narrow directivity and a wide directivity, and includes the essential section of the loudspeaker system 100 of the delay array type in FIG. 3, and the essential section of the array loudspeaker system 100' of the Bessel array type in FIG. 5. It should be noted that the same signs are provided for portions corresponding to those in FIGS. 3 and 5, and no detailed explanation for them will be given.

Loudspeaker units 210-*k* are small loudspeaker units having individual diameters of several cm or smaller. As is well known, since small loudspeaker units have a wide directivity that is almost nondirectional across a wide frequency range, a very wide directivity can be obtained by a directivity control that uses the Bessel array method. Further, for a directivity control of a delay array type, the focal direction can be widely aimed, to the left and right. In addition, when small loudspeaker units are arranged closely, an audio signal in a high frequency area can be controlled.

A first directivity parameter P1 and a second directivity parameter P2 are stored in a directivity control apparatus (storage means) 400. The first directivity parameter P1 is a parameter for providing a narrow directivity such that sound waves output by the individual loudspeaker units 210-*k* advance in an arbitrary direction (a focal direction). The second directivity parameter is a parameter for providing a wide directivity such that sound waves output by the loudspeaker units 210-*k* spread through the entire space. The directivity control apparatus (directivity control means) 400 selects either the first directivity parameter P1 or the second directivity parameter P2, in accordance with an instruction, supplied by an operating unit 700, for selecting the directional characteristic of a loudspeaker array 200, and generates delay control information and gain control information based on the selected directivity parameter (details will be described later).

Figure 7:
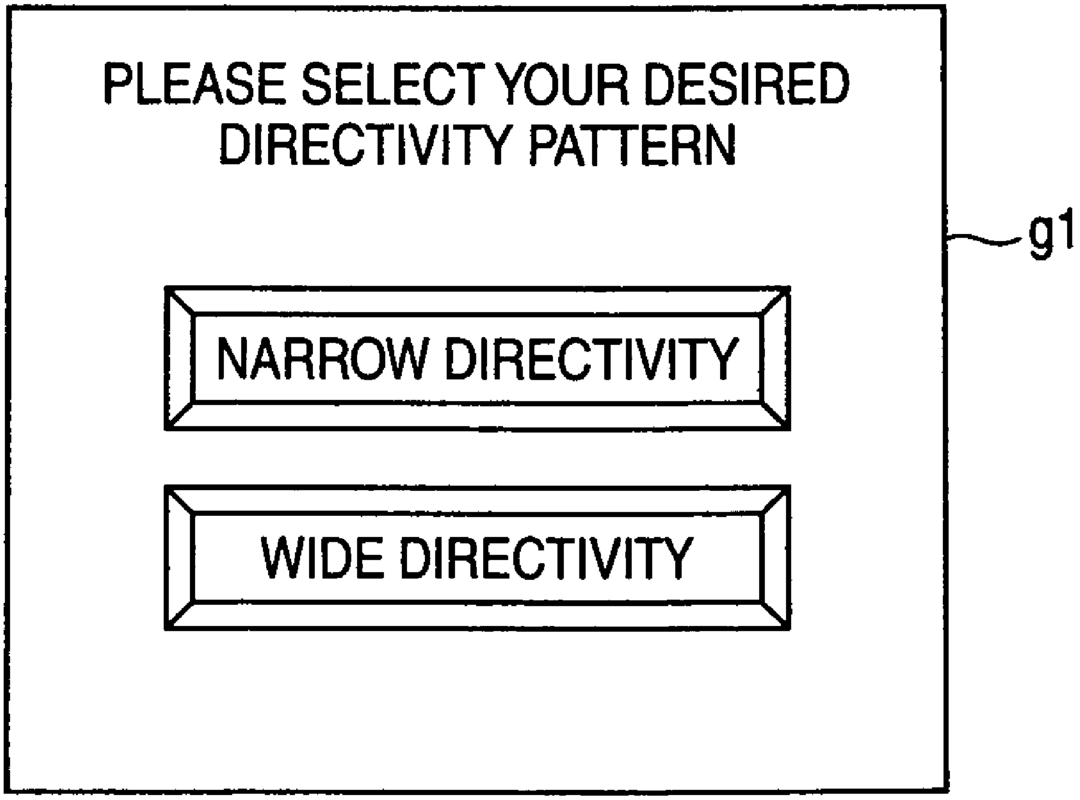
FIG. 7 is a diagram showing an example operating screen according to the mode.
Figure 8:
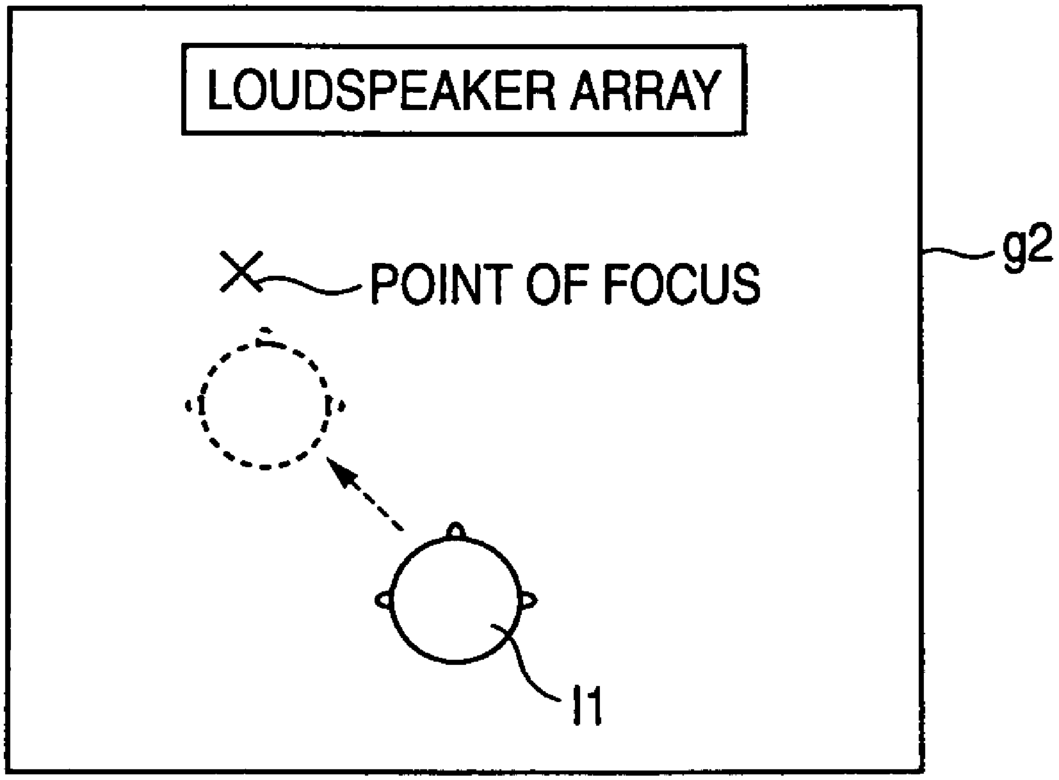
FIG. 8 is a diagram showing an example operating screen according to the mode.

The operating unit (input means) 700 is means for entering, for example, an instruction for selecting the directional characteristic of the loudspeaker array 200, and is constituted by various operating buttons, a remote controller, etc. FIG. 7 is a diagram showing an example operating screen g1 to be displayed on a display device (e.g., a plasma television, etc.) connected to the array loudspeaker system 100". A message to select either a wide directivity or a narrow directivity is displayed on the operating screen g1. Following this message, a user selects one of the directional characteristics by, for example, manipulating a remote controller. When a narrow directivity, for example, is selected in a case, an operating screen g2 in FIG. 8 is displayed on the display device. The user moves a hearing position icon I1, displayed on the operating screen g2, to a desired position by using, for example, a remote controller (see broken line in FIG. 8). Once such a series of processes has been performed, the operating unit 700 supplies, to the directivity control apparatus 400, a selection instruction to select the narrow directivity and position information indicating the hearing position (position information for determining the direction of the directivity).

The directivity control apparatus 400 selects the first directivity parameter P1 in accordance with the selection instruction received from the operating unit 700, and determines a focal position, etc., based on the received position information. And based on the selected first directivity parameter P1, the determined focal position, etc., the directivity control apparatus 400 obtains the amounts of delays, which are to be provided for audio signals that are to be transmitted to the individual loudspeaker units 210-*k*, generates delay control information that indicates the obtained amounts of delays, and transmits the delay control information to a delay circuit (delay means) 300. At the same time, based on the selected first directivity parameter P1, the directivity control apparatus 400 obtains a coefficient (in this case, an appropriate window function coefficient) to be multiplied by audio signals that are to be transmitted to the loudspeaker units 210-*k*, and transmits the coefficient to a weighting unit 500. As a result, the phase of an audio signal entered into the array loudspeaker system 100" is adjusted by the delay circuit 300, a weight using the window function coefficient is added to the resultant signals by the weighting unit 500, and the obtained signals are output as sound waves by the corresponding loudspeaker units 210-*k*. The sound waves output via the loudspeaker units 210-*k* have the same phase as an arbitrary point (the point or focus) in space, so that a narrow directivity desired by a user can be obtained.

On the other hand, in the state wherein the operating screen g1 is displayed on the display device, when a wide directivity is selected by user manipulation of a remote controller, etc., the operating unit 700 transmits to the directivity control apparatus 400 a selection instruction indicating that a wide directivity should be selected. The directivity control apparatus 400 selects the second directivity parameter P2 in accordance with the selection instruction received from the operating unit 700. Then, in accordance with the selected second directivity parameter P2, the directivity control apparatus 400 calculates the amounts of delays to be provided for audio signals, which are to be transmitted to the individual loudspeaker units 210-*k*, and a coefficient to be multiplied by the individual audio signals. In this case, since the second directivity parameter P2 for obtaining the wide directivity is selected, the directivity control apparatus 400 obtains the amount "0" for the delay, or if not "0", the same amount of delay, and a Bessel array coefficient introduced by the Bessel function. The directivity control apparatus 400 generates delay control information and gain control information that represent the amount of delay and the coefficient, and transmits the information respectively to the delay circuit 300 and the weighting unit 500. As a result, the audio signal input to the array loudspeaker system 100" is weighted, using the Bessel array coefficient, by the weighting unit 500, so that wide directivity is provided.

As described above, according to the array loudspeaker system 100" of the first mode, it is possible to switch between narrow directivity, such that sound can be heard with sufficient volume in an arbitrary direction (focal direction) though the volume, on the whole, is low, and wide directivity, such that sound with high quality can be heard regardless of the listening location.

According to the above example, wide directivity has been provided by employing the Bessel array method. However, a method whereby the point of a focus is generated immediately near the front center of the loudspeaker array 200 by controlling the above described amounts of delays, or a simulation method whereby musical sounds are output at an arbitrary point behind the loudspeaker array 200, may be employed to provide wide directivity. These methods can be provided by using the configuration of the array loudspeaker system 100".

Second Mode

In the first mode described above, as an example, either wide directivity or narrow directivity has been selectable. An explanation will be given for a second mode below wherein both wide directivity and narrow directivity are established at the same time.

In the present rapidly aging society, opportunities have increased during which an elderly person, etc., whose hearing capability has declined (hereinafter referred to as a hearing-impaired person) and a hearing-unimpaired person watch one television, etc., at home. In this case, the volume for listening tends to be a problem. For example, a volume appropriate for a person is too low for a hearing-impaired person to listen to, or when a volume is adjusted for a hearing-impaired person, the volume is too high for a hearing-unimpaired.

Under these circumstances, there have been proposed a method for providing special loudspeakers for hearing-impaired people (see, for example, Japanese Patent Laid-Open Publication No. 2000-197196) or a method whereby employed musical sounds are output to a hearing-impaired person by using a loudspeaker array having a narrow directivity, while a hearing-unimpaired person listens to music at d position that avoids the direction of the directivity where the sound pressure is large (see Japanese Patent Laid-Open Publication No. Hei 11-136788).

However, according to the method disclosed in the above described Japanese Patent Laid-Open Publication No. 2000-197196, there is a problem in that separate space for installing the special loudspeakers for hearing impaired-people must be acquired. Further, according to the method disclosed in Japanese Patent Laid-Open Publication No. Hei 11-136788, there is a problem in that, since the direction of the directivity is toward a hearing-impaired person, a hearing-unimpaired audience at a position avoiding the direction of the directivity can not listen to music having a satisfactorily high quality.

The invention of the second mode is provided while taking these conventional problems into account, and the objective is to provide, for example, musical sounds that satisfy both a hearing-impaired person whose hearing capability has declined and a hearing-unimpaired person when they listen to music together.

Figure 9:
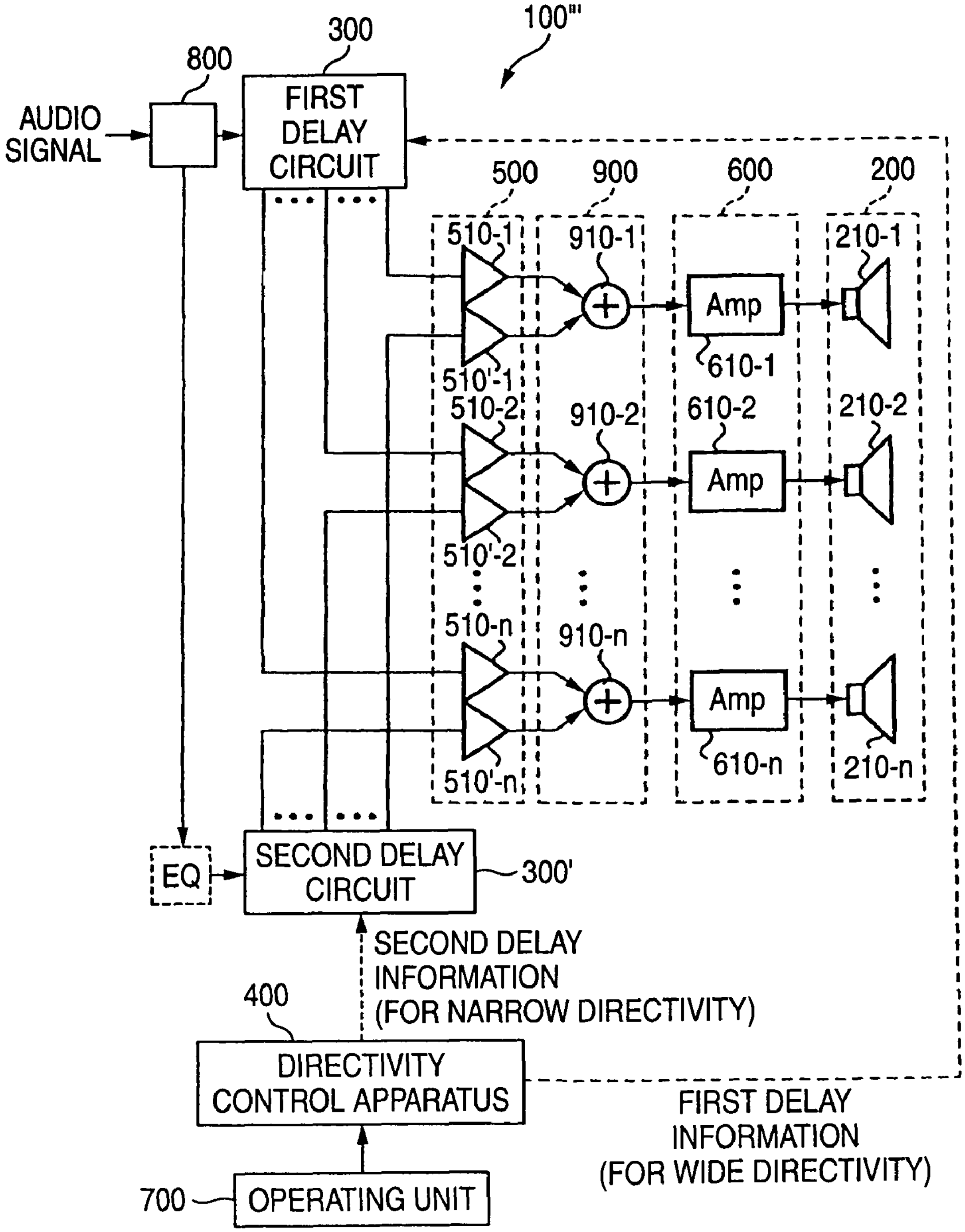
FIG. 9 is a diagram showing the arrangement of the essential section of an array loudspeaker system according to a second mode.

FIG. 9 is a diagram showing the configuration of the essential section of an array loudspeaker system 100'" according to the second mode. In the array loudspeaker system 100'", the same signs are provided for the portions corresponding to those of the array loudspeaker system 100" in FIG. 6, and no detailed explanation for them will be given. In addition, in the following explanation, assume the case is one wherein both a wide directivity and a narrow directivity are to be provided by performing delay control.

A branching unit 800 branches, into two, an audio signal that is input to the array loudspeaker system 100'", and transmits the branched audio signals to a first delay circuit 300 and a second delay circuit 300'.

Figure 10:
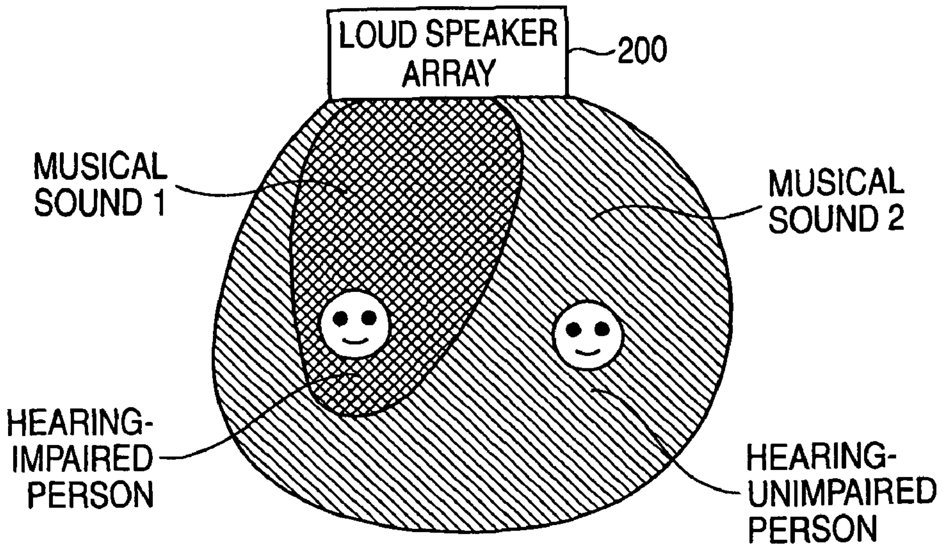
FIG. 10 is a diagram showing an example directivity control pattern according to the mode.

In accordance with first delay control information and second delay control information respectively received from directivity control apparatus 400, the first delay circuit 300 and the second delay circuit 300' perform a delay process for audio signals to be transmitted to individual loudspeaker units 210-*k*. The directivity control apparatus (directivity control means) 400 generates the first delay control in formation and the second delay control information so that the delay circuits 300 and 300' obtain different directional characteristics. Specifically, when, as shown in FIG. 10, for hearing, a hearing-unimpaired person is positioned on a little obliquely left in front, viewed from the loudspeaker 200, and a hearing-impaired person is positioned on a little obliquely right in front, the first delay control information and the second delay control information are generated, so that musical sounds 2 for hearing-unimpaired people are output with a wide directivity, while musical sounds 1 for hearing-impaired people are output with a narrow directivity toward the hearing-impaired person. It should be noted that the hearing positions of the hearing-impaired person and the hearing-unimpaired person can be entered by manipulating a remote controller, etc. In the following explanation, for the sake of convenience, assume the case is one wherein the wide directivity is provided by the first delay circuit 300 and the narrow directivity is provided by the second delay circuit 300'.

The first delay circuit 300 performs a delay proccss to provide the wide directivity for individual audio signals, and transmits the audio signals to corresponding multipliers 510-*k*. On the other hand, the second delay circuit 300' performs a delay process to provide the narrow directivity for individual audio signals, and transmits the audio signals to corresponding multipliers 510'-*k*. The multipliers 510-*k* and 510'-*k* add weights, using predetermined weighting coefficients, to the audio signals obtained through the delay processes, and transmit the resultant audio signals to an adding unit 900.

The adding unit 900 is constituted by the same number of adders 910-*k* as the loudspeaker units 210-*k*. The individual adders 910-*k* add the audio signals received from the corresponding multipliers 510-*k* and 510'-*k*. The audio signals obtained by the adders 910-*k* are transmitted through amplifiers 610-*k* to the corresponding loudspeaker units 210-*k*.

As a result, as shown in FIG. 10, the musical sounds 2 for hearing-unimpairedpeoplearc output through the loudspeaker array 200 with the wide directivity, while the musical sounds 1 for hearing-impaired people are output through the loudspeaker array 200 with the narrow directivity. Thus, when a hearing-impaired person and a hearing-unimpaired person listen to music together in the same space (e.g., in a living room), both of them can enjoy music with satisfactory sounds.

In this case, an equalizer (frequency property correction means) may be provided at the front stage of either the first delay circuit 300 or the second delay circuit 300' to correct a frequency property. Generally, a hearing-impaired person whose hearing capability has declined has difficulty in hearing sounds with high frequency elements. While taking this condition into account, as indicated by a broken line in FIG. 9, an equalizer EQ may be located at the front stage of the second delay circuit 300' to correct the frequency property of an audio signal that is branched. Furthermore, equalizers EQ may be arranged respectively at the front stages of the delay circuits 300 and 300' to correct the frequency properties of musical sounds 1 for hearing-impaired people and musical sounds 2 for hearing-unimpaired people. According to this mode, the interference of the musical sounds 1 and 2, the affect of the acoustic characteristic in space, etc., can be reduced. Of course, each listener may use the operating unit 700 (manipulate a remote controller, etc.) to designate independently the parameters of the equalizers EQ.

Figure 11:
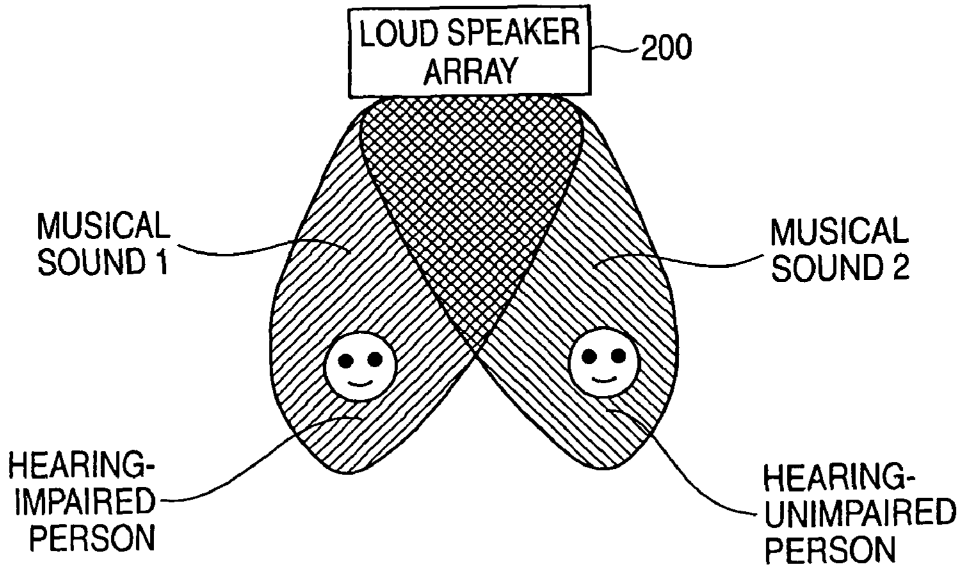
FIG. 11 is a diagram showing a directivity control pattern according to the mode.

In addition, in the above example, an explanation has been given for the mode wherein both the wide directivity and the narrow directivity are established at the same time by the first delay circuit 300 and the second delay circuit 300'. However, the mode is not limited to this subject. In short, two or more different directional characteristics need only be established, and narrow directivities in two directions may be provided at the same time (see FIG. 11). Specifically, while referring to FIG. 11, musical sounds 1 for hearing-impaired people are output to a hearing-impaired person with the narrow directivity, and musical sounds 2 for hearing-unimpaired people are output to a hearing-unimpaired person with the narrow directivity. In this case, the first delay control information and the second delay control information are generated, so that the first delay circuit 300 and the second delay circuit 300' provide respectively the narrow directivity for the hearing-impaired person and the narrow directivity for the hearing-unimpaired person. Of course, the number of branched audio signals and the number of delay circuits may be increased to three or more to provide multiple directivities at the same time.

In the above example, the wide directivity is obtained by performing delay control. However, the wide directivity may also be provided by performing weighting control as explained in the first mode. Further, the configuration for the second mode (arranging delay circuits in parallel, etc.) may be employed for the array loudspeaker system 100" of the first mode so as to obtain the narrow directivity in two directions.

The invention claimed is:

1. An audio signal supply apparatus for an array speaker unit comprising a plurality of loudspeakers, the audio signal supply apparatus comprising:

- a branching unit that branches a same input audio signal into a plurality of signals;
- a directivity control unit that generates first directivity control information and second directivity control information;
- a first delay unit that provides a first delay for one of the branched audio signals and supplies first delay processed signals to all of the loudspeakers of the array speaker unit in accordance with the first directivity control information;
- a second delay unit that provides a second delay for another of the branched audio signals and supplies second delay processed signals to all of the loudspeakers of the array speaker unit in accordance with the second directivity control information;
- a weighting unit that weights each of the delay processed audio signals from the first and second delay units to be supplied to the loudspeakers in accordance with a provided gain coefficient for each of the delay processed audio signals; and
- an adding unit that adds the first and second delay processed signals that have been weighted by the weighting unit before being applied to all of the respective loudspeakers,
- wherein the one branched audio signal provides a first sound output from the array speaker unit and the another branched audio signal provides a second sound output from the array speaker unit,
- wherein a directional characteristic of the array speaker unit for the first sound output differs from the directional characteristic of the array speaker unit for the second sound output, and
- wherein the first sound output and the second sound output are concurrently output.

2. The audio signal supply apparatus according to claim 1, wherein the directional characteristic of the array speaker unit obtained through the first delay is a narrow directivity, and the directional characteristic of the array speaker unit obtained through the second delay is a wide directivity.

3. The audio signal supply apparatus according to claim 2, wherein the amount of delays obtained by the second delay is 0 or an equal amount.

4. The audio signal supply apparatus according to claim 1, further including:

- a frequency property correction unit that corrects a frequency property of one of the branched audio signals output to one of the first or second delay unit.

5. The audio signal supply apparatus according to claim 1, wherein the directivity control unit generates the gain control information, which is supplied to the weighting unit.

6. The audio signal supply apparatus according to claim 2, wherein the directional characteristic of the array speaker unit obtained through the first delay overlaps with the directional characteristic of the array speaker unit obtained through the second delay.

7. The audio signal supply apparatus according to claim 1, further comprising:

- a storage unit that stores the first directivity control information, which sets the directional characteristic of the array speaker unit as a narrow directivity, and the second directivity control information, which sets the directional characteristic of the array speaker unit as a wide directivity,
- wherein the directivity control unit also generates the gain control coefficient, and supplies the gain control coefficient to the weighting unit.

8. The audio signal supply apparatus according to claim 7, wherein the amount of delays obtained by the second delay is 0 or an equal amount.

* * * * *